July 21, 1964
G. R. JOHNSTON
3,141,277
BAG SEALING APPARATUS
Filed Nov. 3, 1961
2 Sheets-Sheet 1
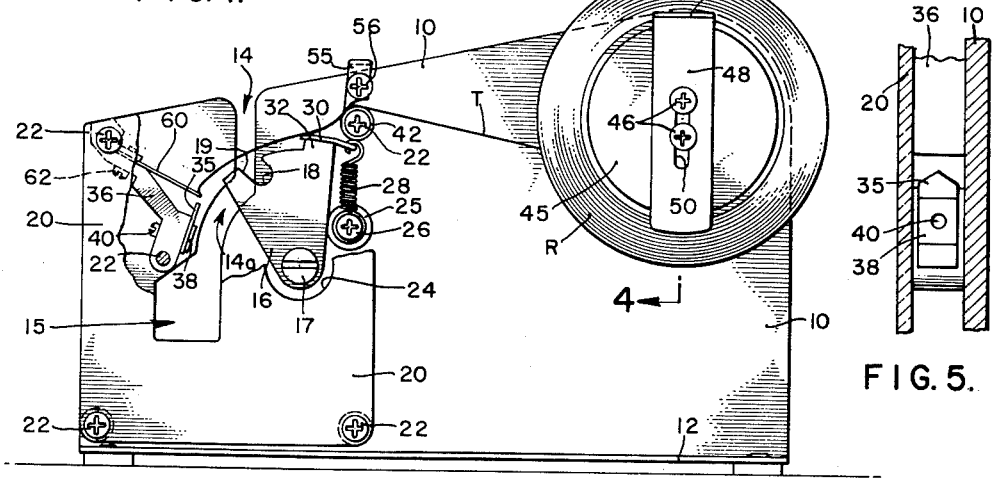
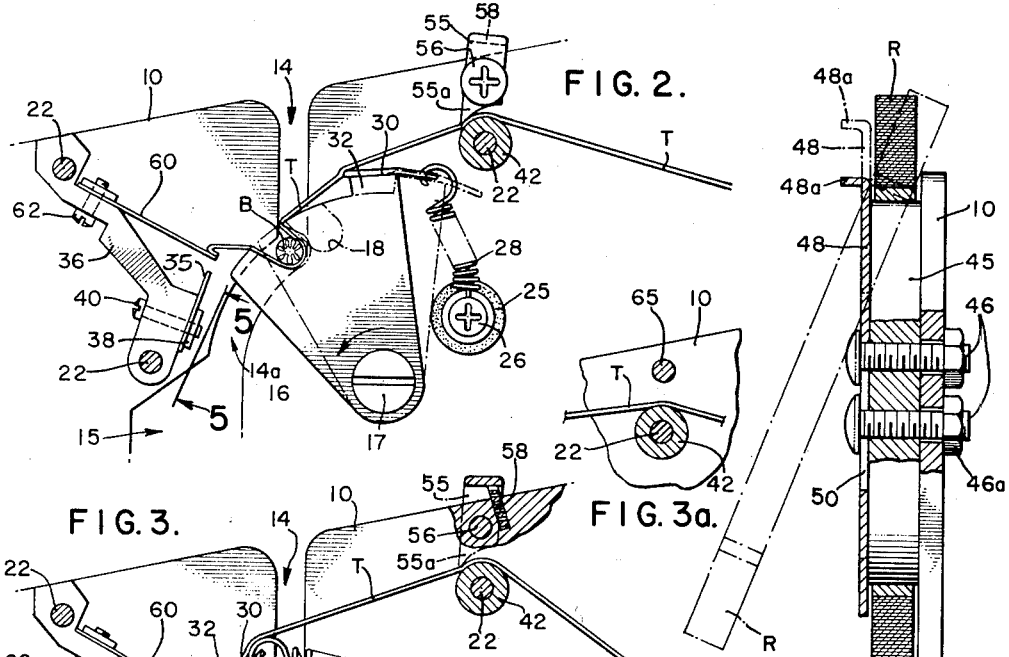
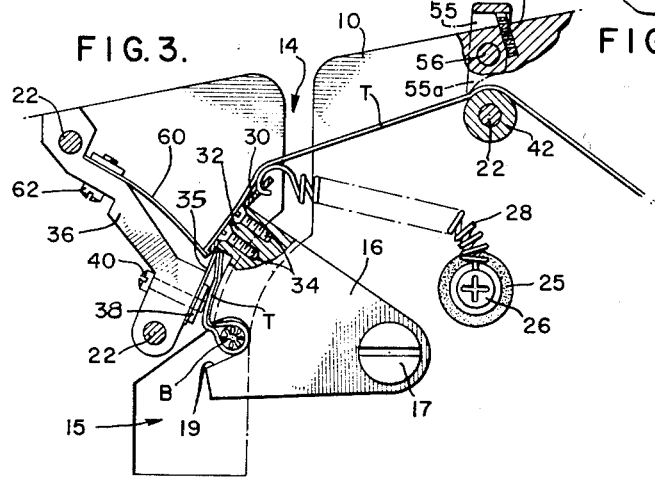
INVENTOR.
GAROLD R. JOHNSTON
BY *Reed & Lawlor*
ATTORNEY.

July 21, 1964  G. R. JOHNSTON  3,141,277
BAG SEALING APPARATUS
Filed Nov. 3, 1961  2 Sheets-Sheet 2
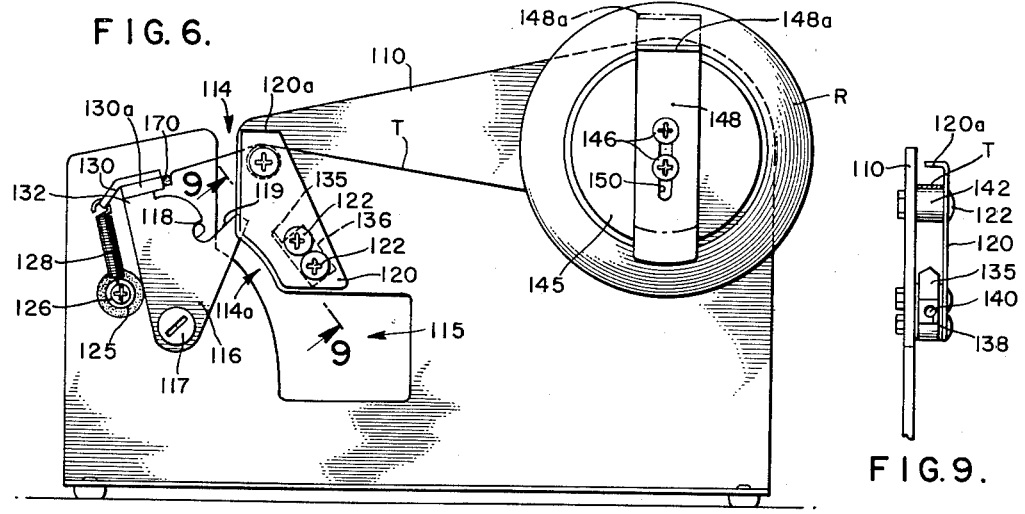
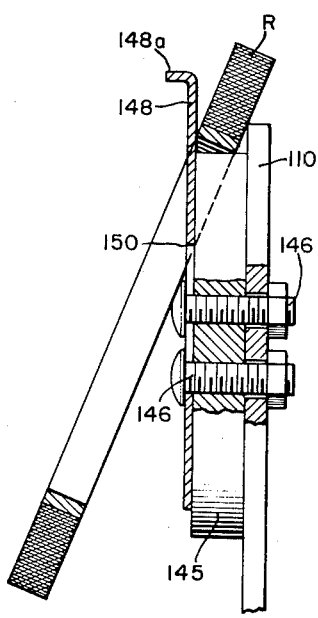
INVENTOR.
GAROLD R. JOHNSTON
BY
ATTORNEY.

United States Patent Office 3,141,277
Patented July 21, 1964

3,141,277
BAG SEALING APPARATUS
Garold R. Johnston, 1625 Westmont Drive, Alhambra, Calif., assignor of one-half to Harold L. Fenton, Reseda, Calif.
Filed Nov. 3, 1961, Ser. No. 150,047
12 Claims. (Cl. 53—198)

This invention relates to means for sealing packages, and more particularly involves apparatus for disposing short strips of sealing tape about the necks of plastic bags used for enclosing vegetables such as carrots, spinach and the like.

It is currently common to dispose various articles of produce, and other commodities, in plastic bags which are commonly transparent and very flexible so that the ends of the bags may be collapsed into small neck elements or bundles roughly cylindrical in shape and often having a diameter when sealed about like that of an ordinary lead pencil.

The principal object of this invention is to provide, especially for the produce trade, a relatively small apparatus of limited length, such as about 12 or 15 inches, and of lesser height, such as about 6 inches or 8 inches by means of which an operator may quickly dispose about the collapsed end of a plastic bag or other flexible bundle a strip of pressure sensitive tape to seal the end of the bag for display on a dealer's vegetable stand and for easy handling by the purchasing housewife.

Another object of the invention is to provide a sealing device of the indicated nature wherewith an operator may quickly seal a bag of the type indicated by the simple expedient of pressing a folded or collapsed bundle portion downward through a slot to effect the sealing operation and then withdrawing the sealed bag laterally for deposit in a crate or other shipping container.

Still a further object of the invention is to provide a sealing apparatus of the stated nature which includes a swinging member having a sealed recess or slot angularly disposed to receive sealing tape and the neck of a bag to be sealed, and then to direct it toward tape severing means, wherefrom the bag is discharged at the end of a downward stroke in sealed condition.

It is also an object to provide an apparatus of the type indicated having a trigger device which functions to receive adhesive tape, and to automatically draw from a supply roll and measure a quantity of tape adequate to seal the bag being handled and also provide and position an adequate supply of tape for initiating a subsequent sealing operation.

A still further object is to provide an apparatus of the indicated nature means for positioning a measured portion of sealing tape properly for application to a bag to be sealed in a subsequent operation of the apparatus and to return the measuring member to the initial position.

Another object of the invention is to provide means for properly aligning and positioning a roll of adhesive tape and for quickly mounting and locking the roll in operative position when the apparatus is being supplied with tape.

Other objects of the invention and the various features of construction thereof will become apparent upon reference to the following specification and the accompanying drawings wherein certain embodiments are disclosed, the first of which is presently deemed to be the best manner of practicing the invention.

In the drawings:
FIG. 1 is a side elevation of a bag sealing apparatus according to this invention;
FIG. 2 is an elevational fragment illustrating an intermediate step of operating during sealing;
FIG. 3 is a view similar to that of FIG. 2 illustrating the final stage of the sealing operation;

FIG. 3A is a fragment showing a variation;
FIG. 4 is a vertical sectional view taken on the line 4—4 of FIG. 1 and illustrating mounting means for the roll of tape seen in FIG. 1, the methods of mounting and demounting such roll being indicated in broken lines;
FIG. 5 is an elevational detail of a knife employed for severing the tape as indicated by line 5—5 of FIG. 2;
FIGS. 6, 7, and 8 are views similar to those of FIGS. 1, 2, and 3 and showing a modification;
FIG. 9 is a detail view taken on the line 9—9 of FIG. 6 and showing the position and mounting of the knife of this form;
FIG. 10 is a view similar to that of FIG. 4 and showing the roll of tape in the process of being mounted.

As illustrated in FIGS. 1, 2, and 3 the present apparatus includes an upstanding flat metallic wall or frame 10 mounted on an appropriate base 12. The frame 10, which is in the form of a metallic or other rigid plate, is provided with a guide slot or passage 14, the upper portion of which is linear and an intermediate portion 14a of which is formed on the arc of a circle, the lower portion being in the form of an enlarged terminal opening or withdrawal passage 15. Mounted adjacent the guide slot or passage 14 is a rotary measuring and feeding trigger 16 carried on a pivot 17 which may be in the form of a small bolt. As constructed, the slot 14 is vertically disposed in the frame or upstanding wall 10, and the upper edge of the trigger 16 is provided with a shallow receiving slot or notch 18 whose median line or axis is in general directed radially toward the axis of the pivot 17 when the trigger 16 stands in its normal or inactive position as seen in FIG. 1. When in this relationship, the notch 18 provides an inclined lower wall 19 which is disposed across the axis of the vertical slot 14 and therefore in the path of any object being moved downwardly in the slot 14. As indicated in FIGS. 2 and 3, such an object is the collapsed or twisted neck B of a flexible plastic bag or the like which is to be sealed and is to be used to cause trigger 16 to rotate about its pivot 17 from the position of the parts as seen in FIG. 1, through the position illustrated in FIG. 2 and into the position of FIG. 3 where the neck B of the bag will be discharged downward from the notch 18 along the inclined wall 19 into the passage 15 from which it may be withdrawn from either side of the wall 10.

As indicated in FIG. 1, a guard plate 20 may be placed outside the operative parts, including the trigger 16, whereby to shield them and at the same time protect and guard the operator's fingers. The material of the plate 20, which is secured by several bolts or screws 22, desirably is transparent, such as glass or stiff plastic, and it is provided with slots and a passage corresponding with the vertical slot 14, the curved slot 14a and the withdrawal passage 15. Desirably, it is also provided with a large hole 24 opposite the pivot bolt 17, and such other access holes may be formed in it or in the frame wall 10 as desirable.

In operation, return movement of the trigger 16 to initial position is limited by a stop 25 which may be a heavy cushioning washer retained as by a screw 26 which also serves the purpose to anchor one end of a return spring 28. As shown, the upper end of the return spring 28 is secured to a projecting end of a shearing blade 30 mounted on an offset or outstanding edge portion 32 of the trigger 16 at the side of the trigger remote from the receiving notch 18 and suitably anchored as by screws 34 seen in FIG. 3. The shearing blade 30 cooperates with a knife blade 35 mounted on a holder block 36 conveniently of angular shape as illustrated and retained as by means of two of the positioning bolts 22. In this instance, the holding block itself serves as the spacer between the frame wall 10 and the guard plate 20. The knife blade 35 is bound to the holder 36 through the medium of a small anchor plate 38 and an anchor screw 40 as best seen in FIG. 2. Either or both of the shearing blade 30 and the knife blade 35 may be sharpened to act as the cutter blade or blades.

The offset of the outstanding portion 32 of the trigger 16 as shown is such that, at the limit of the trigger movement as seen in FIG. 3, the shearing blade 30 passes behind the knife blade 35 to cause the latter to cut off the tape T which has been drawn forward into the sealing position illustrated in FIG. 3. Thus, the overhanging offset 32 of the trigger 16 acts as a stop to limit the forward swinging movement of trigger 16 by reason of engagement thereof with a stationary element on the holder 36 which may be the cutting blade 35 or other adjacent portion. Also, the advancing end of the blade 30, which normally is blunt, acts to position the tape to be cut behind the cutting blade 35 somewhat as illustrated in FIG. 3.

With respect to the positioning and the movement of the tape T, this tape is taken from a roll R of pressure sensitive adhesive tape well known in the trade, and is drawn off the roll R in a generally forwardly progressing direction by advancing with the trigger 16. At all times the tape T is positioned above or overlies the trigger. Guiding of the tape T from the roll R is effected by passage over a cylindrical guide and positioning sleeve or roller 42 carried on one of the previously mentioned positioning bolts 22. This relationship with respect to the upper edge of the trigger 16 and the knife blade 35 is such that the tape T tends to drop down upon the swinging edge of the trigger 16 and maintain itself in a ready position for a sealing operation upon the neck B of the flexible bag to be closed.

The roll R of the tape T is conveniently carried by a circular holder 45 which may be a disc that is secured to the frame 10 as by a pair of bolts 46 threaded into holder disc 45 and fixed in the frame by lock nuts 46a. To retain the roll of tape R, a vertical slide 48 is held behind the heads of the bolts 46 as illustrated in FIG. 4, the bolts being received in a vertically disposed slot 50. When the upper end of the slot 50 drops upon the upper bolt 46 the slide 48 assumes the position illustrated in full lines and retains the roll R in its operating position, both ends of the slide 48 extending beyond the circumference of the holder 45 and overhanging the tape roll R. Upon raising the slide 48 through the medium of a finger piece 48a to the broken line position of FIG. 4, the lower end of the slide 48 clears the lower portion of the roll R and permits it to be swung out into the broken line position of FIG. 4 so that the roll may be removed and replaced.

With the preferred construction and use of this apparatus, the tape T is drawn forward over the guide roll 42 and across the top of the trigger 16 approximately as seen in FIG. 1. With some tapes it is desirable that a retainer and guide in the form of a pivoted dog 55 be used as illustrated in FIGS. 1, 2, and 3. This dog 55 is retained in position above the guide roller 42 by means of a pivot bolt or screw 56 which permits the dog to rock. The lower end of the dog 55 is shaped as a curved tooth indicated at 55a to press the tape T against the guide roller 42 and to prevent retraction in the direction of the roll R. For this purpose, a spring 58 seen in FIG. 3 is set in a countersunk bore in the top of the frame wall 10 in position to press upward against an overhanging ledge of the dog 55 to cause the tooth 55a to assume the biting position illustrated. In employing tape T of the type indicated, a tape-positioning finger 60 in the form of a leaf spring is provided. It is secured as by a bolt 62 to the holder block 36. This finger 60 projects angularly downward toward the tape T and into the path of the shearing blade 30 so that the extremity of the finger 60 lies at and receives the severed end of the tape, when the latter is in its operative position as illustrated, and adjacent the cutting extremity of the upstanding knife blade 35 which, as also illustrated, is thus directly substantially tangential with respect to the path of movement of the swinging trigger 16 and the blade 30. This holds the free end of the tape T from flying upward when being severed, the tacky side of the end of the tape adhering to the adjacent face of the end of the finger 60 as shown. The moving extremity of the spring finger 60 also acts, at least to some extent, as a stop for the swinging trigger 16 by reason of the impact of the advancing end of the blade 30 upon the movable end of the finger 60.

However, with some tapes, it may be necessary to employ the dog 55 and with such tapes it may be merely necessary that a guide element 65 or the like be located at a short distance above the guide 42 as indicated in FIG. 3a. The element 65 may even be the screw or bolt 56 from which the dog 55 has been removed.

In conducting bag sealing operations, with the form of FIGS. 1 to 5, the tape T will have been drawn over its guide 42 from the roll R and carried across the upper edge of the trigger 16 approximately in the position indicated in FIG. 1 and the tacky side of its extremity stuck to the upper face of the end of the guide finger 60. The middle portion of the section of tape T between the guide 42 and the cutter blade 35 is thus positioned alongside the vertical slot 14, the tacky side of the tape T being directed upward as is indicated by the relation of the loose portion of the tape T with respect to the roll R.

A plastic bag or similar container, having been filled with articles being packaged, is then manipulated by the operator to compress an outer end portion, which is to be sealed, into a collapsed or twisted bundle or neck portion B which is long enough to be grasped between the fingers of the two hands of the operator. This folded neck portion B is then passed downward into the slot 14 where it bears upon the upper tacky side of the underlying piece of tape T. Movement is continued until the neck portion B carries the tape down into the notch 18 so that the tape bears upon the lower sloping wall 19.

Continued downward movement brings the neck portion B of the bag to the lower end of the vertical slot portion 14 and then to the curved slot portion 14a. Further movement brings such bag portion B from the position of FIG. 2 approximately to the position of FIG. 3. In this position, two opposed tacky portions of the tape T are brought together and, in such contacted relation, lie along the adjacent outer curved portion of the trigger 16 between the notch 18 and the outstanding portion 32 carrying the shearing blade 30 and such contacted tape portions also lie closely adjacent the small anchor plate 38. At this stage, approximately as indicated in FIG. 3, the advancing portion of the tape T is forced by the shearing blade 30 into adhering contact with the end of the finger 60 and into cutting contact with the top edge of the knife blade 35. During these motions, when the bag portion B has contacted the tacky upper surface of the length of tape T and forced it down into the notch 18, frictional contact of the back of the tape T with the respective walls of the trigger 16 and adhering contact of the tacky surface of the tape T with the bag portion B cause the tape T to be drawn across the guide 42 as the trigger 16 swings downward from the position of FIG. 2 to the position of FIG. 3, so that tape is drawn from the roll R. When the tape reaches the upper cutting edge of the knife blade 35, the previously severed end of the tape T adhering to the positioning finger 60 will have been pulled from the finger 60 and drawn down past the knife blade 35 into position lying along the mentioned curved portion of the trigger 16 forward of the outstanding portion 32. When this end portion of the tape has cleared the knife blade 35, the tensioned tape length now engages the outer cutting end of the knife blade 35. At about the same time, the leading end of the shearing blade 30 passes behind the upper end of the knife blade 35, and forces the tape into adhering contact with the end of the finger 60 and causes the tape to be cut or sheared off. This leaves a sealing loop of tape T as seen in FIG. 3. The adjacent tacky surfaces of the ends of this loop will have been previously brought into contacted sealing relation by reason of the near approach of the adjacent curved wall of the trigger 16 to the anchor plate 38 holding the knife blade 35 as above described.

Continued downward movement by the operator from the position of FIG. 3 causes the collapsed and wrapped bag neck B to slide off the inclined wall 19 of the notch 18, thereby releasing the trigger 16, the wrapped portion B passing into the withdrawal passage 15. The return spring 28 now snaps the trigger 16 back into the initial position of FIG. 1, and the operator withdraws the sealed end of the bag laterally from the passage 15. The newly severed end of the tape remains adhered to the end of the finger 60 and is returned with the latter to the position of FIG. 1, the tape being now ready for the next sealing operation.

In FIGS. 6 to 10 inclusive there is shown a modification of the structure of FIGS. 1 to 5, similar parts of the modified form being represented by the same reference characters in a 100 series, that is with a prefix 1, whereby for example the counterpart of the trigger 16 of FIGS. 1 to 5 is indicated as 116 in FIGS. 6 to 10.

The structure of the modification of FIGS. 6 to 10 differs largely in the matter of arrangement, although structures of some of the parts differ. With respect to the arrangement, this is such that the tape T during the sealing operation is drawn back under itself in a reverse curve arrangement, especially as seen in FIG. 8, this being due to the fact that the direction of rotation of the trigger 116 with respect to the roll R is opposite to the direction of the trigger 16 of the preferred form of FIGS. 1 to 5. Thus, in view of the fact that the unrolled end of the tape T does not continue in its forward or progressing position, as in FIGS. 1, 2 and 3 but is folded back under itself, it is necessary to provide means for transporting the extremity of the severed tape T to a position to be ready for the next bag sealing operation. For this purpose, the shearing blade 130 is a two part blade, of which the second part 130a is channel-shaped and the two parts 130 and 130a hold between them a block of material to which the tacky surface of the tape T will adhere until pulled off by forces encountered during the sealing operation. This block of material 170 may be any material to which the tape will adhere, such as metal, wood, or a piece of sponge rubber. In practice, it has been found that a piece of the synthetic rubber polychloroprene, commonly known on the market as neoprene, may be very successfully used.

With this particular form of the invention, when the bundle or twisted neck portion B of the bag to be sealed is forced down through the slot 114 it contacts the upper tacky surface of the tape T as before and thus forces the tape down into the notch 118 against the sloping notch wall 119 as indicated in FIG. 7. This pulls the extremity of the tape T away from the neoprene block 170 as the bag neck and the tape are being forced into the notch 118, during which time the tape T is being pulled off the roll R as it passes around the guide 142. Under those circumstances, the back of the shearing blade portion 130a passes behind the knife blade 135 to cut off the tape as indicated in FIG. 8. Somewhat as with the other form, the trailing end of the strip of tape T, which has been wrapped around the bag neck B, has been brought into contact wtih the adjacent portion of the tacky surface of the tape T which has passed around the other side of the bag neck B. It is at this stage that the tape T is cut off by the shearing blade 130a working against the knife blade 135.

The severed extremity thus produced on the main length of the tape T is now forced down into contact with the rectangular knife holder block 136, thereby forcing the extremity of the neoprene piece 170 against the tacky tape surface. As the operator forces the neck B of the bag to the limit of the downward movement in the notch 118, the sloping wall 119 thereof is moved low enough to permit the neck B to clear the adjacent edge of the frame wall 110 and pass into the withdrawal passage 115. The end portion of the tape T lying between the top of the guide 142 and the top of the holder block 136, at the time of severance, is long enough, when the trigger 116 has been returned to initial position by the spring 128, to extend from the top of the guide 142 across to the end of the neoprene block 170 in its restored position, as indicated in FIG. 6. Preferably the parts are arranged so that such severed end of the tape will be long enough to extend in a curved or slack position as indicated by the broken line Ts in FIG. 7.

With this arrangement, the adherence of the tacky extremity of the tape T to the block 170 carries such end of the tape from the severance position of FIG. 8 up to the initial position of FIG. 6 so that the tape is ready for a subsequent sealing operation.

In this particular form of the invention, the overlying guard plate 120 is reduced to a size to enclose only the holder block 136, the knife 135, and the guide roller 142. As seen in FIG. 9, the top of the guard plate 120 is flanged over at 120a to serve as a cooperative guide member for retaining the strip of tape T upon the guide roller 142.

While more than one embodiment of the invention is herein disclosed, other modifications will occur to those skilled in the art, and it is intended to cover all such variations as fall within the scope of the claims of the patent.

The invention claimed is:

1. In combination in bag sealing apparatus:
   a frame having an outwardly extending passage to receive at its outer end the folded neck of a bag to be sealed and having a withdrawal portion at its inner end for removal of such folded neck when sealed;
   a trigger swingingly mounted on said frame adjacent said outwardly extending passage to swing across said passage and having an inwardly directed notch to span and follow said passage;
   stop means to limit swinging movement of said trigger in an advancing direction;
   means to return said trigger from its foremost advanced position to an initial position;
   stop means to limit movement of said trigger to its initial position;
   the outer end of said notch opening into said passage when said trigger is in initial position and said trigger having at one side of said notch a wall for said folded bag neck to bear upon and cause rotation of said trigger against said return means, a portion of said passage being curved to be followed by said folded bag neck in said notch as said trigger swings, and a part of the withdrawal portion of said passage being offset for discharge of the sealed bag neck from said notch and wall;
   shearing means on the trailing side of said trigger; and cooperating knife means on said frame at one side of said passage for severing tape near the end of movement of said trigger and the shearing means thereon.

2. A combination as in claim 1 including guide means on said frame adjacent the initial position of the trailing side of said trigger to direct the feed end of a strip of sealing tape across the outer edge portion of said trigger adjacent said passage and said notch in initial position, the distance between said guide means and said notch in initial position beng approximately equal to the distance between said cooperating knife means and said notch in initial position.

3. A combination as in claim 1 wherein the distance from said trailing shearing means along the outer end of the trigger and down into the bottom of said notch approximately equals the distance between said cooperating shearing means and down into the bottom of said notch when the latter is in initial position.

4. A combination as in claim 1 including a circular holder carried by said frame for a roll of adhesive tape and sliding means on said holder for releasably retaining said roll of tape.

5. A combination as in claim 1 wherein said knife means is directed substantially tangential to the path of said swinging trigger.

6. In combination in a bag sealing device:
a frame having an outwardly extending passage in said frame to receive the neck of a bag to be sealed;
a swinging trigger pivoted on said frame and having at its swinging end a wall to receive a strip of sealing tape thereon and the collapsed neck of a bag thereagainst to swing said trigger and press the bag neck against the tape, said trigger being provided with extending means providing a stop for engaging means on said frame to limit advancing movement of said trigger;
means for returning said trigger to its initial position;
means to direct sealing tape across said trigger; and
cooperating severing means on said frame adjacent said passage and severing means on said trigger to engage between them and sever tape on said bag neck, one of said severing means being directed substantially tangential to the path of movement of said trigger.

7. A combination as in claim 6 including a circular support for a roll of tape adjacent said directing means, and slidable latching means on said support overhanging opposite portions of said roll to releasably hold said roll of tape.

8. In combination in a bag sealing device;
a frame having an outwardly extending passage in said frame to receive the neck of a bag to be sealed;
a swinging trigger pivoted on said frame and having at its swinging end a wall to receive a strip of sealing tape thereon and the collapsed neck of a bag thereagainst to swing said trigger and press the bag neck against the tape;
means to direct sealing tape across said trigger;
cooperating severing means on said frame adjacent said passage and severing means on said trigger to position between them and sever tape on said bag neck, one of said severing means being directed substantially tangential to the path of movement of said trigger; and
positioning means movable in position adjacent said severing means on said frame for pressing a severed end of the tape into adhering contact with said positioning means, said positioning means comprising a spring finger on said frame and projecting into the path of the severing means on said trigger to receive the severed end of said tape and movable to clear said severing means on said frame.

9. In combination in a bag sealing machine:
an upstanding frame having an outwardly extending passage to receive the neck of a bag to be sealed;
a swinging trigger pivoted on said frame and having at its swinging end a wall to receive a strip of sealing tape thereon and the collapsed neck of a bag thereagainst to swing said trigger for pressing the bag neck against the tape and moving such bag neck downwardly through said passage;
cutting means upstanding on said upstanding frame at one side of said passage adjacent the path of movement of said swinging trigger;
cooperating means on a trailing portion of said pivoted trigger to engage tape end around said neck moving through said passage to said upstanding cutting means, said cooperating means being movable into a position beside said cutting means for severing tape on said bag neck, said swinging trigger having an extending portion carrying said cooperating means and serving as a stop when said cooperating means reaches its severing position;
means for returning said swinging trigger to initial position to receive a bag neck; and
stop means for limiting the return movement of said swinging trigger to its initial position.

10. A combination as in claim 9 including:
a finger mounted on said frame with an end projecting toward said cutting means and into position in the path of said cooperating means on said swinging trigger for engagement by the advancing end of said cooperating means to press a newly severed tape end against the extremity of said finger to receive and retain said tape end in position for a subsequent bag-sealing operation.

11. A combination as in claim 10 wherein said finger is a spring finger whose projecting end is movable by said cooperating means when the latter moves to tape-severing position.

12. A combination as in claim 9 including a second cooperating means to cooperate with the first mentioned cooperating means for engaging and retaining a newly severed end of said tape.

References Cited in the file of this patent
UNITED STATES PATENTS

| | | |
|---|---|---|
| 1,645,734 | Berry | Oct. 18, 1927 |
| 2,591,136 | Cleary et al. | Apr. 1, 1952 |
| 2,841,935 | Kreuger | July 8, 1958 |
| 2,916,863 | Leighton | Dec. 15, 1959 |
| 3,015,925 | Kreuger | Jan. 9, 1962 |